US006295056B1

(12) United States Patent
Morgan et al.

(10) Patent No.: US 6,295,056 B1
(45) Date of Patent: Sep. 25, 2001

(54) MODULATING THE DIMENSIONS OF ENVIRONMENTALLY RELATED AND PROPORTIONALLY SIZED DISPLAYED OBJECTS TO CONFORM SELECTED OBJECT DIMENSIONS TO LIMITATIONS OF A DEFINED DISPLAY SPACE

(75) Inventors: Scott Anthony Morgan; John Martin Mullaly; Craig Ardner Swearingen; Alan Richard Tannenbaum, all of Austin, TX (US)

(73) Assignee: International Business Machines, Armonk, NY (US)

( * ) Notice: Subject to any disclaimer, the term of this patent is extended or adjusted under 35 U.S.C. 154(b) by 0 days.

(21) Appl. No.: 09/204,915

(22) Filed: Dec. 3, 1998

(51) Int. Cl.[7] ....................................................... G06F 15/20
(52) U.S. Cl. ............................ 345/334; 345/351; 345/433
(58) Field of Search ..................................... 345/332, 333, 345/338, 339, 342, 349, 350, 420, 440, 441, 472, 121, 334

(56) References Cited

U.S. PATENT DOCUMENTS

| 5,577,189 | * | 11/1996 | Gay et al. .............................. 345/326 |
| 5,670,984 | * | 9/1997 | Robertson et al. ................... 345/139 |
| 5,896,133 | * | 4/1999 | Lynch et al. .......................... 345/357 |
| 6,081,277 | * | 6/2000 | Kojima ................................. 345/439 |

* cited by examiner

Primary Examiner—John Cabeca
Assistant Examiner—Cao H. Nguyen
(74) Attorney, Agent, or Firm—J. B. Kraft; Richard A. Henkler; Leslie A. Van Leeuwen (57) ABSTRACT

A computer controlled user interactive display system with an implementation for displaying within a defined display space a plurality of objects having dimensions proportionally representative of physical parameters of elements respectively represented by said objects, but this system is provided with a further implementation for nonlinearly modulating at least one dimension of at least one of said displayed objects so as to conform the object dimension to the dimensional limitations of the defined display space without affecting the dimensional status of the object with said modulated dimension relative to the other objects.

18 Claims, 6 Drawing Sheets

MODULATING THE DIMENSIONS OF ENVIRONMENTALLY RELATED AND PROPORTIONALLY SIZED DISPLAYED OBJECTS TO CONFORM SELECTED OBJECT DIMENSIONS TO LIMITATIONS OF A DEFINED DISPLAY SPACE

TECHNICAL FIELD

The present invention relates to user interactive computer supported display technology, and particularly to such user interactive systems and methods which provide interactive users with user friendly interfaces which simulate a real world environment by presenting to the user interactive objects which represent and are often images of real world elements.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes, it seems as if virtually all aspects of human endeavor in the industrialized world requires human/computer interfaces. There is a need to make computer directed activities accessible to a substantial portion of the world's population which, up to a few years ago, was computer illiterate or, at best, computer indifferent. In order for the vast computer supported market places to increase in productivity, it will be necessary for a large segment of consumers of limited computer skills to relate to computer interfaces. Thus, the challenge of our technology is to create interfaces to computers which are as close to the real world as possible. Among the various expedients for conveying realism in interfaces is the use of displayed objects which are images of the real world elements and functions which the objects represent. To increase the realism of objects, visual clues are used such as depth and spatial perception conveyed through advanced computer graphical rendering techniques. All of such efforts make the work of user interface developers and designers more complex and challenging. The present invention should provide such developers with one more tool which they may use in their challenging tasks.

In order to convey real world perceptions which will make users of the interfaces feel more at home or comfortable, displayed objects are frequently environmentally related or associated with each other, e.g. buildings on a street, stores in a mall, or books on a shelf. In such an environment, rich visual clues may be conveyed to users by representing the depth and spatial relationships of the interface objects. This requires that the objects be defined with dimensions which constitute the objects' relative height, width, depth, distance etc. In order to present information in a way that human users are familiar with from their interactions in the real or physical world, these dimensions are proportional to the corresponding dimensions of the real world elements which the displayed objects represent. Unfortunately, in such image rendering, problems may arise because the real world is big and, perhaps, dimensionally unlimited while the computer display screen or window is small and, of course, dimensionally limited.

With objects having dimensions which are very large or very small in comparison to their associated objects or in comparison to the display screen or window, we have recognized that there are problems in presenting such objects. Conventionally, the display interface technology has solved these problems by scrolling, i.e. when large objects cause the environment of objects to expand beyond the screen or window limits, showing only a portion of the object and scrolling to the rest as needed. On the other hand, if there are objects relatively too small to be perceived on the display screen, then increasing the relative proportions of all of the objects which will, of course, expand the environment of objects beyond the limits of the screen and then scrolling to objects as needed. While scrolling may, under certain interactive circumstances, be an appropriate real world equivalent, e.g. strolling down a street or a mall aisle, there are many instances when scrolling is an entirely inappropriate real world metaphor. For example, if the object environment is a set of books on a user's desk or file titles in a draw sleeve, in the real world environment the user will see all of the book objects at a glance. Thus, the need to scroll through a group of books may disrupt the real world "sitting at your desk" metaphor.

SUMMARY OF THE PRESENT INVENTION

The present invention provides a solution to the above problems by providing a computer controlled user interactive display system with means for displaying within a defined display space a plurality of objects having dimensions proportionally representative of physical parameters of elements respectively represented by said objects, but this system is provided with further means for nonlinearly modulating at least one dimension of at least one of said displayed objects so as to conform the object dimension to the dimensional limitations of the defined display space without affecting the dimensional status of the object with said modulated dimension relative to the other objects. This system is particularly applicable to displays in which the elements are real world elements, and the displayed objects are images of said elements and the objects are environmentally associated with each other within the defined display space. Thus, the dimensions of the displayed objects would be virtual proportional representations of the actual dimensions of said real world elements.

The required modulation may only involve a single dimension of a single object or it may involve multiple dimensions of a plurality of objects. Most frequently the modulation is required either because a particular object, if rendered in linear proportion to its corresponding real world element, would be so large that the set of displayed objects would be extended beyond the limits of the display space, or the linearly rendered object may be so small that it and/or its function are not discernible within the size limitations of the display space. In this connection, we have found that if the problem object dimension which is to be nonlinearly modulated is modulated by an arc-tan function both minimum and maximum dimensions appropriate to the display space size may be achieved.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
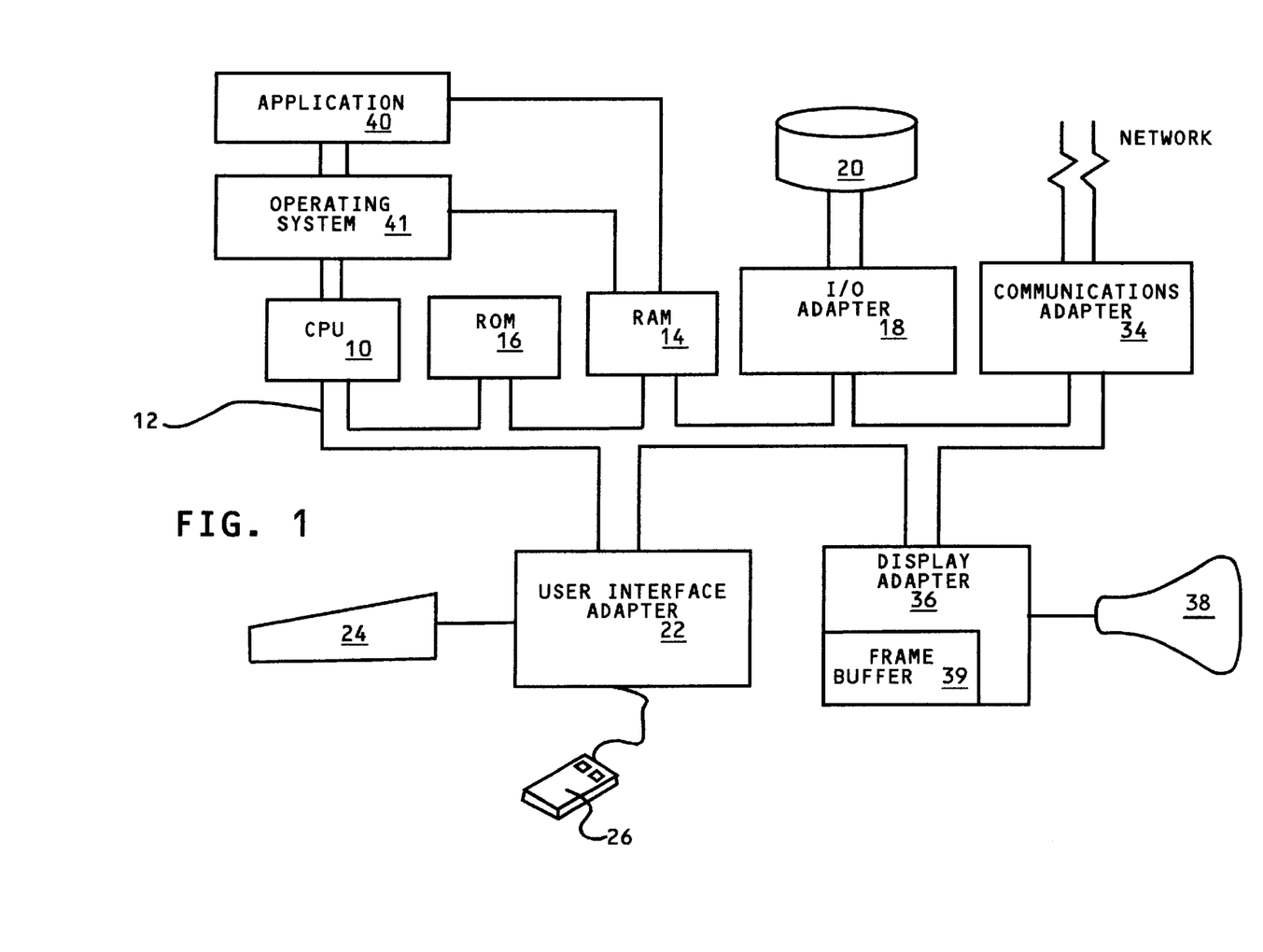
FIG. 1 is a block diagram of a personal computer or laptop computer unit which is capable of implementing the displayed object dimensional modulation in accordance with the present invention.

Referring to FIG. 1, a typical data processing system is shown which may function as the computer controlled display terminal used in implementing the system of the present invention by providing a limited display space for a set of environmentally related objects and the means for nonlinearly modulating dimensions of rendered objects to conform such objects to the limitations of display spaces such as windows. A central processing unit (CPU) 10 is included in the computer, which may be a PC or laptop available from International Business Machines Corporation (IBM), or Dell Computer Inc. The CPU 10 is interconnected to various other components by system bus 12. An operating system 41 runs on CPU 10, provides control and is used to coordinate the function of the various components of FIG. 1. Operating system 41 may be one of the commercially available operating systems such as the OS/2™ operating system available from IBM (OS/2 is a trademark of International Business Machines Corporation); Microsoft's Windows 95™ or Windows NT™, as well as UNIX or AIX operating systems. Operating system 41 and application programs 40 controlled by the system, including the nonlinear modulation program of the present invention, are moved into and out of the main memory RAM 14 and consequently into and out of secondary storage, disk drive 20, as needed. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with outside networks enabling the data processing system to communicate with other computer systems. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the display control programs of the present invention. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Figure 2:
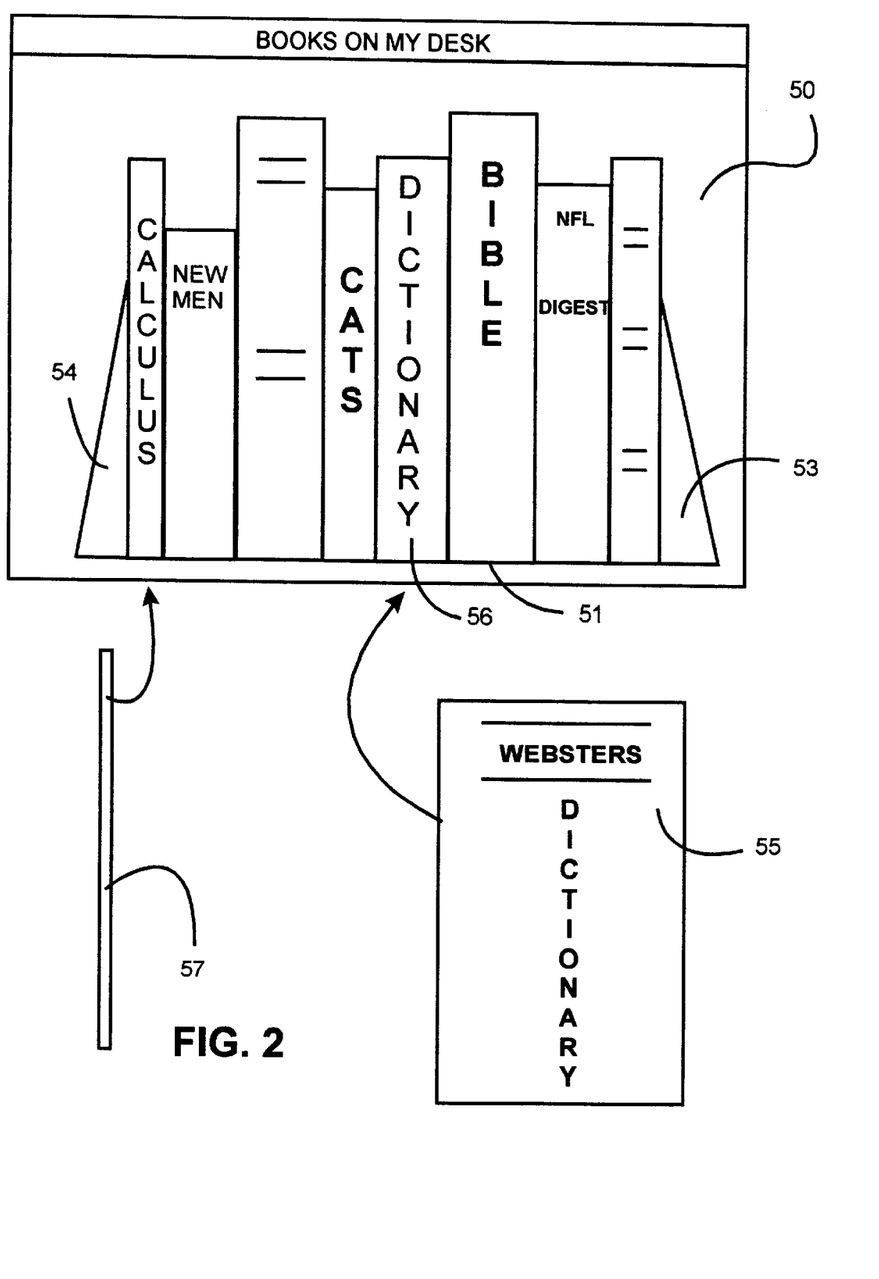
FIG. 2 is a diagrammatic illustration of a display space with a desk set of books object environment showing a pair of books to be added to the desk set.
Figure 3:
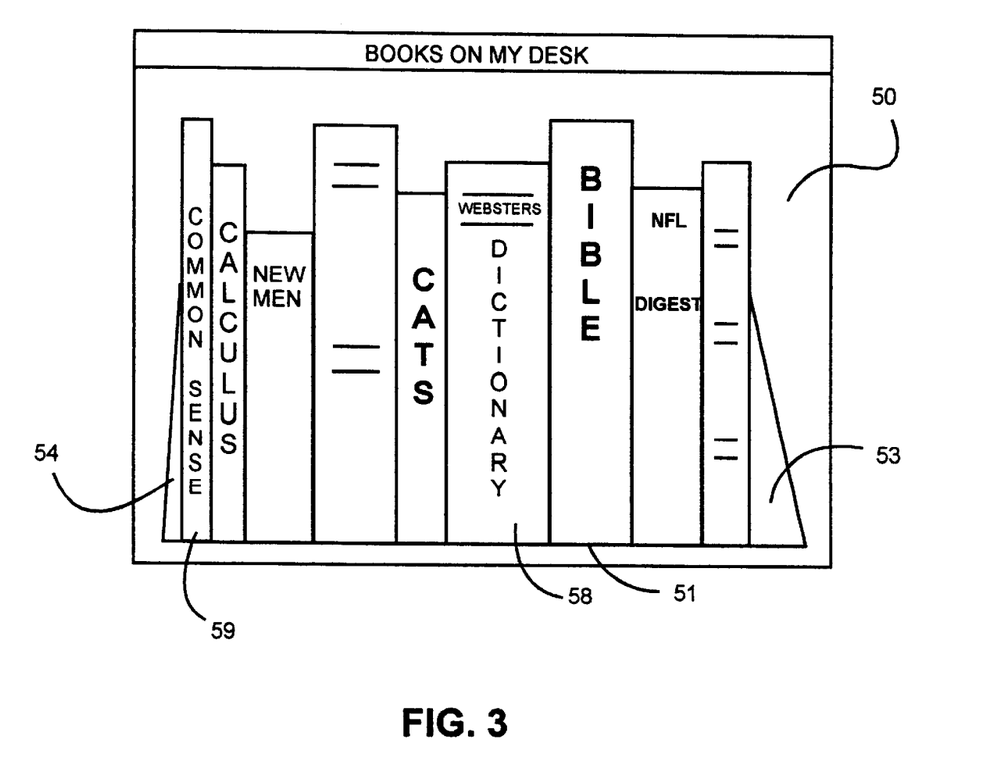
FIG. 3 is the display space of FIG. 2 after the pair of books has been added and substituted.

Now with reference to FIGS. 2 through 5, some illustrations of the present invention will be given. FIG. 2 shows a user interactive desk set of books 51 within a limited screen space 50, which could be the entire screen of a PC or laptop or a window in such a display screen. The books 51, which are shown as substantially filling the display space 50, are supported at either end by a pair of bookends 53 and 54. In operation, display space 50 and its book objects 51 are presented to the viewer on display monitor 38 of FIG. 1. In accordance with conventional techniques, the user may control the display objects through a conventional I/O device such as mouse 26 of FIG. 1 which operates through user interface 22 to call upon application programs 41 in RAM 14 cooperating with the operating system 41 to create the images in frame buffer 39 of display adapter 36 to control the display on monitor 38.

In any event, the desk set of books 51 is intended to create objects which are proportionally dimensioned book objects representing the real world set of books. Although not shown in the illustration, in addition to dimension correspondence the books may be contoured, shaded and colored so as to look like the real desk set of books. In using this desk set metaphor, the displayed environment is intended to make the user feel the comfort of having a set of books which have been of recent or ongoing interest to him. Now let us assume that the user has interactively accessed from a source outside of his desk set two other books which he wishes to add to his desk set: "Websters Dictionary" 55 in replacement of the current dictionary 56. However, if dictionary 55 which is very wide were to replace dictionary 56, the set of books 51 would be likely to expand beyond the width limits of display space 50. On the other hand, if pamphlet 57 which is entitled "Common Sense" were to be placed in the desk set, its width is so narrow that its title or any other information about it could not be conveyed to the user of display space 50. In such a situation, by using the nonlinear modulation process of the present invention, to be subsequently described in greater detail, the width of book object 57 is increased to provide book object 59 of FIG. 3 having a minimal width from which the title, "Common Sense" as well as the book object itself, are discernible. Similarly, the width of book object 55 is modulated to reduce it to the width of corresponding book object 58 in FIG. 3, which does extend the width of set of books 51 beyond the width limits of display space 50. It should be noted that while book objects 59 and 58 have been nonlinearly modulated in width from their original linear width proportions, they have retained their width status or rank with respect to the other books in set 51, i.e. book 59 is still the thinnest book while 58 is the widest book.

Figure 4:
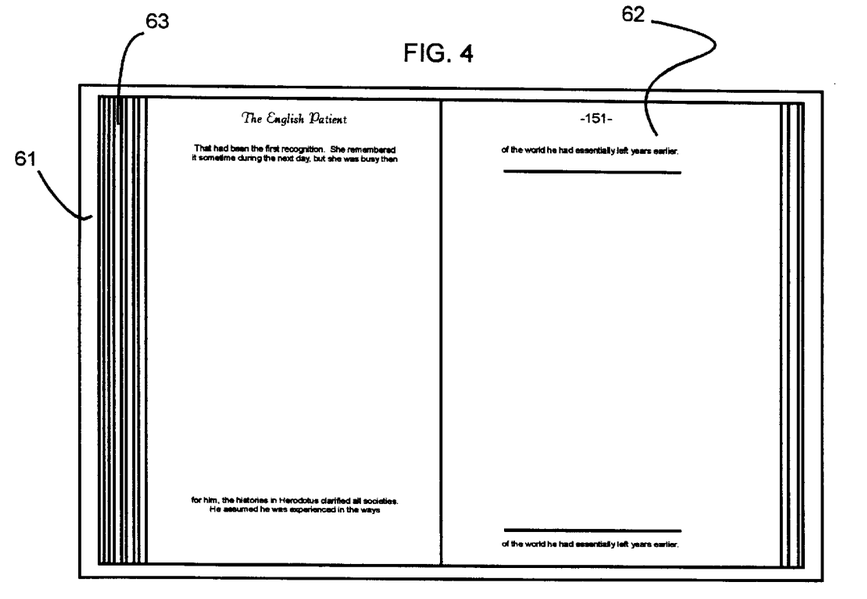
FIG. 4 is a diagrammatic illustration of a realistically rendered selected open book being read on a computer and showing the two fore edge objects framing the open book.
Figure 5:
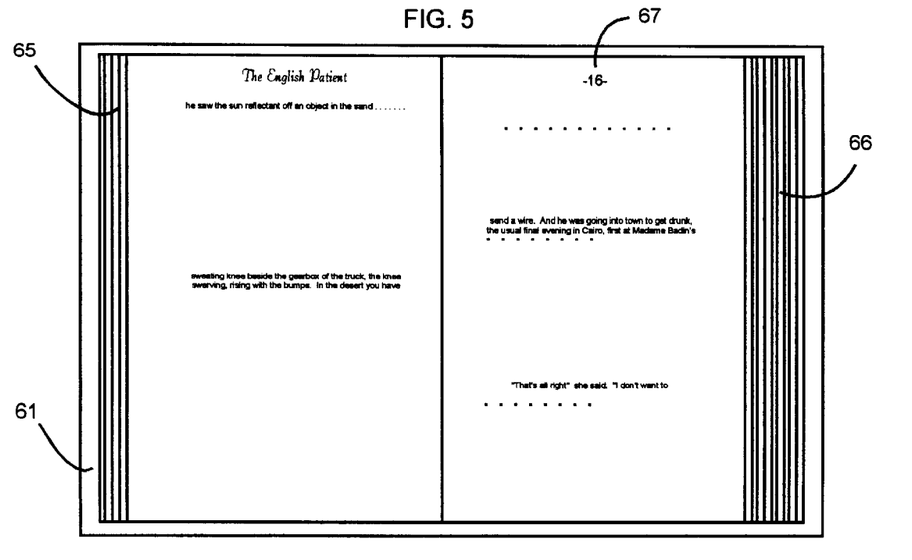
FIG. 5 is the same illustration of FIG. 4 with the book open to different pages and, thus, with different fore edge objects.

With respect to FIGS. 4 and 5, we will describe another aspect of the present invention: the user interactive presentation of computer books. There is currently a rapidly increasing trend toward computer books wherein an entire book is read or several research pages accessed by the user on a display space in a laptop or larger personal computer. Considerable developmental effort has been spent by the industry to make the computer pages of such books come as close as possible to actual books. The displayed book pages have been whitened and toned so as to resemble paper and the text and graphics toned so as to resemble print. There has also been an effort to make the computer screen resemble a book opened to an opposing pair of pages. To further create this realistic effect, the display must present the two fore edges of the parted pair of pages in realistic proportions and the fore edges should extend substantially to the vertical edges of the display space so as to maximize the size of the pages and to make the parted page book image come as close as possible to real book page images. By applying the present invention to such images, we have in FIG. 4, an open book image 62 wherein the pages are parted to page "151". As such, the entire width of display space 61 is filled and fore edge object 63 is substantially wider than fore edge object 64 to, thus, indicate that we are more pages from the front of the book than we are from the end of the book. By comparison, in changing the pages of the same book on the same display space 61 in FIG. 5, we have now parted pages 67 to page "16". Thus, fore edge object 65 is much smaller than fore edge object 66 as an indication that we are very close to the front of the book and a great distance from the end of the book. In the described changing of opened pages, the fore edges may be modulated in width using the process to be subsequently described in greater detail so as to realistically display fore edge objects 65 and 66 while completely filling the width of display space 61 in FIG. 5.

Figure 6:
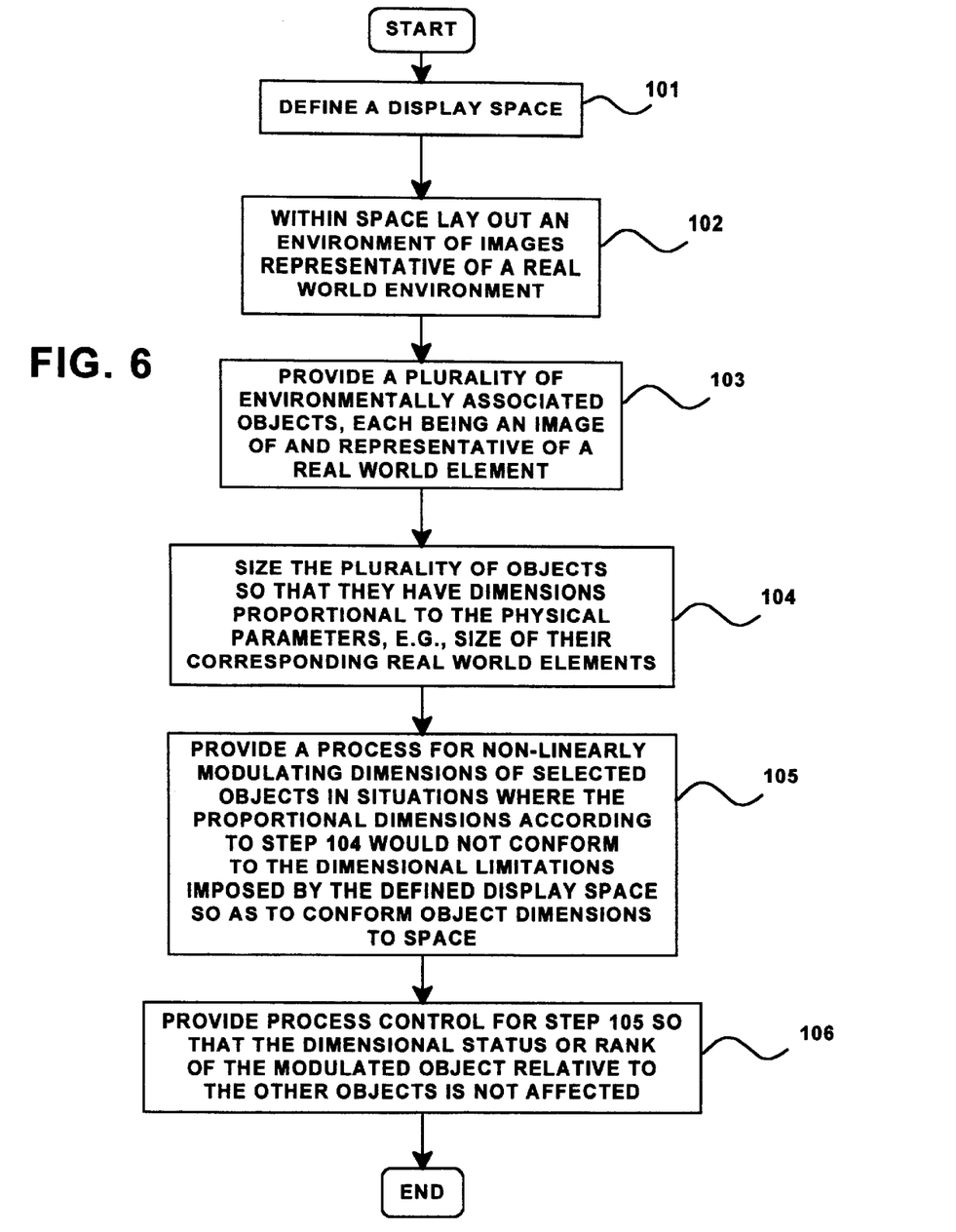
FIG. 6 is a flowchart of the basic units of the present program in a computer controlled display system for creating and using the nonlinear modulation of display rendered object dimensions to fit the display space limitations.
Figure 7:
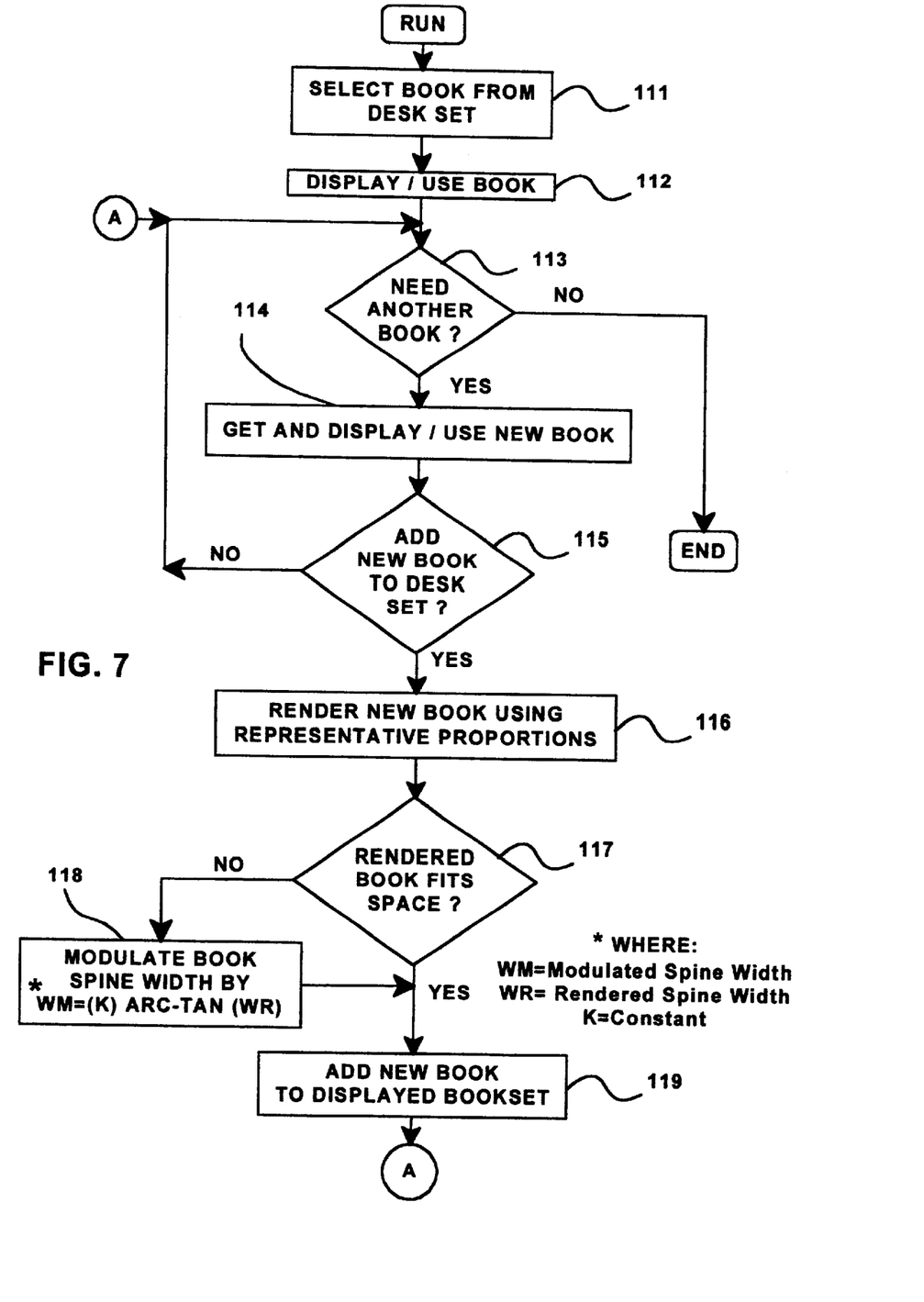
FIG. 7 is a flowchart of the steps involved in running the program set up in FIG. 6.

Now with reference to FIGS. 6 and 7 we will describe a process implemented by the present invention in conjunction with the flowcharts of these figures. The steps in FIG. 6 relate to the development and set of the display object dimension modulating process, while the steps in FIG. 7 cover an illustrative run of the process. Referring to FIG. 6, a display space is defined, step 101; this may be the entire display screen or a window in a display screen defined by any of the windowing operating systems described above. Then, step 102, within this space an environment is laid out resembling the real world, e.g. the desk book set environment of FIGS. 2 and 3. Means are provided for setting up a plurality of environmentally associated objects which are images of real world elements, step 103, e.g. the set of books in FIG. 2. These objects are sized, step 104, so that they have dimensions in proportion to the physical parameters, e.g. dimensions, of their corresponding real world elements. Now the development must provide a process, step 105, for nonlinearly modulating dimensions of selected objects when it is necessary under circumstances where the proportional dimensions sized according to FIG. 4 would not result in the objects conforming to the dimensional limitations imposed by the defined display space. Lastly, step 106, appropriate controls are provided for step 105 so that the dimensional status or rank of the modulated object with respect to the other objects is not affected.

Now, with reference to FIG. 7 a simple run of a process according to the present invention will be described using the desk set of book objects of FIG. 2. First, step 111, a book is selected from the desk set and the book is displayed and interactively used, step 112, by the user. Then, step 113, the user decides whether he wishes to use another book. If No, the process may be ended. If Yes, then, step 114, the book is gotten and displayed. If the book is from the set already in the user's desk set of books of current interest, the book is merely returned to the shelf. However, for purposes of this illustration, let us assume that the book is not one currently in the user's desk book set, e.g. the book was loaded into the computer through its disk or CD drives and obtained from elsewhere in the computer system. Then, step 115, a decision is made by the user as to whether he wishes to add the book to his desk set. If No, the process is returned to step 113 where a determination is made as previously described as to whether another book is needed.

However, if the decision from step 115 is Yes indicating that the user wishes to add the new book to his desk set, then, step 116, the book object for the new book is rendered using the conventional linear proportions for the book object representative of the corresponding real world book. Then, decision step 117, a determination is made as to whether the new book, as linearly rendered, fits the space. For example, with respect to FIG. 2, if the new book is dictionary 55 which is to replace dictionary 56, a linearly rendered dictionary 55 would not fit between ends 53 and 54 in display space 50. The width of its spine would push the width of the book beyond the limits of the display space. Thus, step 118, the width of the spine of book 55 is nonlinearly modulated using the formula:

$$WM = (K)\arctan(WR).$$

WR is the linearly rendered conventional width, WM is the modulated width, K is a linear constant to provide appropriate screen proportions and the arc-tan function is the nonlinear function. While other nonlinear functions such logarithmic functions may be used. We have found that in displays such as book rows or sets which use real world metaphors wherein object dimensions have to be modulated if they are either too small or too large for the display space, the arc-tan function is a preferable one. As a result of this modulation, the Websters dictionary 55 is narrowed to spine width 58, FIG. 3, where it now fits into the desk set 51. Thus, the new book is now added to the book set, step 119, FIG. 7. Similarly, if the decision from step 117 was Yes, i.e. the linearly rendered book spine did fit, then the process would have proceeded directly to step 119 without modulation. At this point, the process returns to step 113 where it is determined whether another book is needed. If Yes, then the above process is repeated; or if No, the process is ended.

While we have illustrated the nonlinear modulation of a single dimension, the width of the object, it will be understood that under appropriate circumstances several dimensions of an object would have to be, thus, modulated to get the object to conform to display space limitations. Also in the example, only a single object was subjected to dimensional modulation. However, under appropriate circumstances, several objects might have to be modulated in order to get a set of objects to conform to the display space limitations. It will be understood that in carrying out the nonlinear modulation, it is desirable that the objects in the set still retain their status or ranking with respect to each other even after modulation. Since modulation most frequently may involve either the largest or the smallest objects in the set, the rankings are relatively easy to maintain. However, there may difficulties in maintaining the rankings of the set of objects when the initial object which extends the set of objects beyond display limitations, thus requiring modulation, is sized in the middle rank. In such a case, the process may involve nonlinearly modulating a dimension of another object either into or in place of modulating the initial object.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled user interactive display system comprising:

means for displaying within a defined display space, a plurality of environmentally associated image objects having dimensions proportionally representative of the actual dimensions of real world elements respectively represented by said objects, and means for nonlinearly modulating at least one dimension of at least one of said displayed objects so as to conform the object dimension to the dimensional limitations of the defined display space without affecting the dimensional status of the object with said modulated dimension relative to the other objects.

2. The display system of claim 1 wherein said objects are book structures.

3. The display system of claim 2 wherein said book structures are book edges.

4. The display system of claim 2 wherein said book structures are book spines.

5. The display system of claim 1 wherein a plurality of the dimensions of said object are modulated.

6. A computer controlled user interactive display system comprising:

means for displaying within a defined display space, a plurality of environmentally associated image objects having dimensions proportionally representative of the actual dimensions of real world elements respectively represented by said objects, and means for nonlinearly modulating by an arc-tan function at least one dimension of at least one of said displayed objects so as to conform the object dimension to the dimensional limitations of the defined display space without affecting the dimensional status of the object with said modulated dimension relative to the other objects.

7. A computer implemented user interactive display method comprising:

displaying within a defined display space, a plurality of environmentally associated image objects having dimensions proportionally representative of the actual dimensions of real world elements respectively represented by said objects, and nonlinearly modulating at least one dimension of at least one of said displayed objects so as to conform the object dimension to the dimensional limitations of the defined display space without affecting the dimensional status of the object with said modulated dimension relative to the other objects.

8. The method of claim 7 wherein said objects are book structures.

9. The method of claim 8 wherein said book structures are book edges.

10. The method of claim 8 wherein said book structures are book spines.

11. The method of claim 7 wherein a plurality of the dimensions of said object are modulated.

12. A computer implemented user interactive display method comprising:

displaying within a defined display space, a plurality of environmentally associated image objects having dimensions proportionally representative of the actual dimensions of real world elements respectively represented by said objects, and nonlinearly modulating by an arc-tan function at least one dimension of at least one of said displayed objects so as to conform the object dimension to the dimensional limitations of the defined display space without affecting the dimensional status of the object with said modulated dimension relative to the other objects.

13. A computer controlled display program having program code included on a computer readable medium comprising:

means for displaying within a defined display space, a plurality of environmentally associated image objects having dimensions proportionally representative of the actual dimensions of real world elements respectively represented by said objects, and means for nonlinearly modulating at least one dimension of at least one of said displayed objects so as to conform the object dimension to the dimensional limitations of the defined display space without affecting the dimensional status of the object with said modulated dimension relative to the other objects.

14. The computer program of claim 13 wherein said objects are book structures.

15. The computer program of claim 14 wherein said book structures are book edges.

16. The computer program of claim 14 wherein said book structures are book spines.

17. The program of claim 13 wherein a plurality of the dimensions of said object are modulated.

18. A computer controlled display program having program code included on a computer readable medium comprising:

means for displaying within a defined display space, a plurality of environmentally associated image objects having dimensions proportionally representative of the actual dimensions of real world elements respectively represented by said objects, and means for nonlinearly modulating by an arc-tan function at least one dimension of at least one of said displayed objects so as to conform the object dimension to the dimensional limitations of the defined display space without affecting the dimensional status of the object with said modulated dimension relative to the other objects.

* * * * *